April 14, 1964 C. LHEUREUX 3,129,398
PRINTED COIL WITH REMOVABLE CORE SUPPORT AND CORE
Filed Jan. 2, 1962
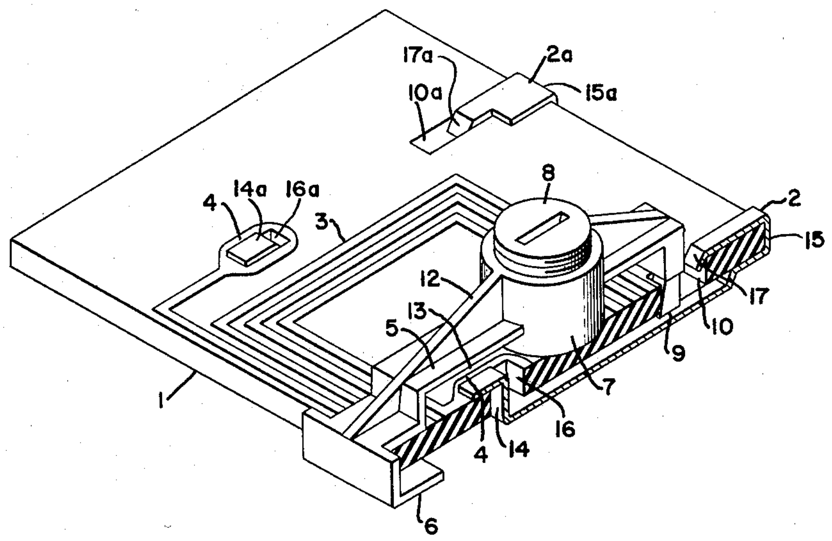
INVENTOR:
CLAUDE LHEUREUX,
BY Joseph Levinson
HIS ATTORNEY.

3,129,398
PRINTED COIL WITH REMOVABLE CORE SUPPORT AND CORE

Claude Lheureux, Coubron, France, assignor to Compagnie Francaise Thomson-Houston, Paris, France, a corporation of France Filed Jan. 2, 1962, Ser. No. 163,607
Claims priority, application France Jan. 13, 1961
3 Claims. (Cl. 336—136)

This invention relates to improvements in printed circuits and deals more especially with the manufacture of circuit elements employing these techniques.

Usually when setting up electric circuits on a printed circuit basis, the workman has basic circuit elements available, such as resistors, capacitors, inductance coils, which he connects into circuit by soldering.

Other elements, such as electron tubes, may also be connected into these circuits. However, in some cases it is convenient to be able to make circuit elements, or some parts of them, directly by the use of printed circuit methods. In other words, it is possible to make printed circuits directly that have the insulating base serving to support the electrical connections proper as well as some component circuit elements, the entire combination resulting from the same manufacturing process. Among such circuit elements may be mentioned some capacitors and inductors.

A notable example of this is the case of television receivers. These generally have high frequency circuits grouped in a rotary switch. This allows the program to be received to be selected.

This rotary switch usually consists of a frame, supporting the wiring, in combination with a drum on which are mounted cards that support windings tuned for the high frequency circuits of each channel selected.

These cards are made from material having good high frequency insulating properties. They include fixed contacts, for each channel selected, for connecting the corresponding windings on the card to the wiring on the frame. In order to be able to line up the receiver, each coil has an adjustable core that can be moved into the mandrel on which the coil is wound.

It is a long and costly process to make these cards by hand. They have to be adjusted coil by coil.

To keep the sale price within bounds, it is now customary to use printed circuit methods for making such cards. The latter can then be made in quantity by machine. The inductors are wound flat on the cards.

They may be printed with the aid of a silk screen, in the case of silk printing processes, or with the aid of a photographic negative in the case of photogravure.

The accuracy of such reproduction makes it possible in many cases to dispense with individually adjusting each card. The adjustment is actually made by retouching the screen or the photographic montage before undertaking quantity production, this retouching being done with the aid of a standard sample that has been lined up in advance.

Large inductances are needed to receive some channels. These can only be made by the photogravure process which allows obtaining an accuracy and thinner lines than would be possible with silk printing. In order to be able to make such inductors, the lines must have very close tolerances in width. This involves stricter manufacturing inspection. Besides this, there are more rejects than with silk printing, thus tending to make the price higher.

To reduce rejects as much as possible, the tolerance in width of the lines must be increased. This involves a greater spread in the characteristics of the inductors as made, so the inductors must be tuned by different adjustments from those used in the preliminary setting.

It is therefore necessary to provide a ruled set of coordinates when laying out these inductors so as to be able to make the final adjustment by cutting off certain portions. Such adjustment is made individually when mounting the card on the rotary switch. The adjustments are delicate and take a long time, hence are troublesome.

The object of this invention is to make inductors having flat windings on an insulating support, this winding being made by the printed circuit method with provision for rapid adjustment of the inductnce, with relatively large manufacturing tolerances.

One feature of the invention is a method of making an adjustable inductor that has a flat winding on an insulating card, made by the printed circuit method, the inductance adjustment being made with the aid of a core that can be moved with respect to a support mounted on the said card, the motion of the said core being similar to that which would be obtained if it were moved into a coil made on a cylindrical mandrel.

In accordance with another feature of the invention, the above mentioned support consists of a ribbed part that has a recess in the middle of it for receiving the core, one end of this part being made in the shape of a U-clamp that fits on the edge of the card supporting the inductor, the other end having a lug that fits in a recess in the said card that is so located as to put the support in the proper position with respect to the winding of the inductor.

It is important that after the support has been located, it must be firmly fastened to the card.

In accordance with another feature of the invention, the centering lug on the support is slightly slanting in such a direction that when this support is mounted on the card, an elastic force tends to press the bottom of the clamp against the edge of the said card, thus locking the said support.

Other features of the invention will be apparent from the following description, which is not restrictive, referring to the attached drawing the single figure of which shows a perspective view of an inductor made in accordance with the principle of the invention.

This drawing shows an insulating card 1 that supports a winding 3 that is made by the printed circuit method. This winding is connected to the other circuit elements by fixed contacts 2 and 2*a* that clamp on to the card. As clearly shown in cross-section in the drawing, each of the contacts 2 and 2*a* includes respectively associated L-shaped ends 14 and 14*a* and U-shaped ends 15 and 15*a*. The L-shaped ends 14 and 14*a*, respectively, project through first and second apertures 16 and 16*a* provided in the insulating card 1 and engage the ends of the winding 3, the U-shaped sections 15 and 15*a* engaging an edge of the insulating card 1. The L-shaped ends 14 and 14*a* are soldered to the ends of the winding 3 at points 4. Adjustment of the inductance is accomplished with the aid of a magnetic core 8 having a threaded portion on an outer surface thereof for reception within a threaded recess in part 7. This part 7 is integral with the support 5 which is made of an insulating material having a high dielectric constant. One section of this support is a clamp 6 that is U-shaped, fitting on the edge of the card. The combination is centered and locked by a lug 9 that fits into a third aperture 10 that also serves for the ear portion 17 of the associated contacts 2 to hook into, a similar aperture 10*a* being provided for the ear portion 17*a* associated with the contact 2*a*. This lug slants slightly so that when the support is assembled, an elastic force tends to press the bottom of the clamp 6 against the edge of the card 1.

Ribs 12 make the support adequately rigid. Clearance 13 permits avoiding the point 4 at which the inner end of the winding 3 is soldered.

The inductance of the coil is adjusted by screwing the core 8 in or out, thus changing its distance from the plane of card 1.

It is obvious that the preceding description was given as a non-restrictive example and that other modifications are conceivable without thereby departing from the spirit of the invention.

What I claim as new and desire to secure by Letters Patent of the United States is:

1. An adjustable inductance comprising: a mounting board comprised of an electrical insulating material and including an aperture and an edge, an electrical inductor comprised of a printed wire positioned on said mounting board and arranged in a loop of multiple turns in a same plane, a cylindrical shaped magnetic core including a threaded portion on an outer surface of said core, and a support for said core centered with respect to said loop and having a substantial portion thereof disposed above said plane of said loop, said support including a U-shaped section engaging said edge of said board, a lug portion having a surface binding said support to said board when said lug engages said aperture, and a threaded cylindrical recess, said cylindrical recess being disposed above said plane of said loop and receiving said core for adjustable positioning of said core relative to said wire loop.

2. An adjustable inductance and connections thereto comprising a thin flat board of insulating material, a loop of multiple turns of printed wire in a plane on one surface of said board, said loop having a first end and a second end, first and second apertures in said board respectively adjacent said first and said second ends of said loop, and a third aperture in said board, said third aperture being located outside of said loop and adjacent one side thereof, a core support comprised of insulating material and centered with respect to said loop with a substantial portion thereof disposed above said plane of said loop, said support having a U-shaped section at one end thereof, said U-shaped section fitting over an edge of said board at a point on the opposite side of said loop from said third aperture, said support also having a lug projecting through said third aperture, the side of said lug facing the U-shaped section being slanted and engaging the edge of said third aperture nearer to said U-shaped section so as to provide an elastic force in a direction to urge said U-shaped section into firm contact with the edge of the board, said support having a recess therein disposed above said plane of said loop, a core mounted in said recess, said core being adjustable within said recess for varying the distance between said core and the plane of said loop, and first and second contacts each having an L-shaped end and a U-shaped end, the L-shaped ends being respectively mounted in said first and second apertures and making electrical contact with the ends of said loop adjacent thereto, the U-shaped ends each engaging an edge of said board at a point displaced from the point of engagement of said U-shaped section with said board.

3. An adjustable inductance comprising a mounting board of electrical insulating material having an aperture therein located a predetermined distance from an edge of said mounting board, an electrical inductor comprising a loop of printed wire positioned in a plane on one side of said mounting board intermediate said aperture and said edge, a body of magnetic material and a support therefor, said support being centered with respect to said loop and having a substantial portion thereof disposed above said plane of said loop, said support having a recess therein disposed above said plane of said loop for receiving said body and including means for adjustably positioning said body relative to said printed wire, and said support further including a U-shaped section at one end thereof fitted over said edge of said mounting board in engagement therewith and a lug at the other end thereof extending through said aperture from said one side of said mounting board and engaging an edge of said aperture.

References Cited in the file of this patent

UNITED STATES PATENTS

| | | |
|---|---|---|
| 2,611,807 | Lazzery | Sept. 23, 1952 |
| 2,718,623 | Yoder | Sept. 20, 1955 |
| 2,836,805 | Goldsmith | May 27, 1958 |